Sept. 6, 1932.  H. W. LUCAS  1,875,384
REFLECTOR
Filed June 10, 1930
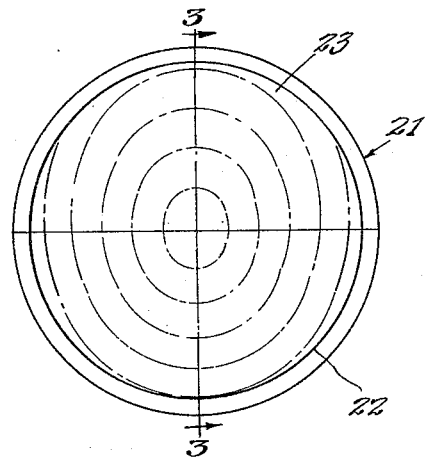
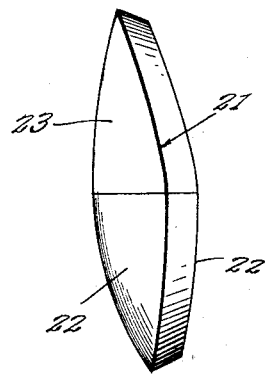
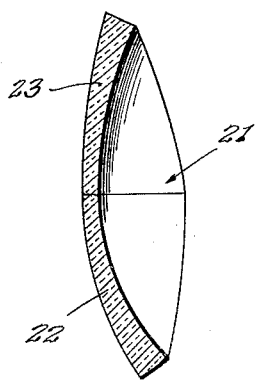
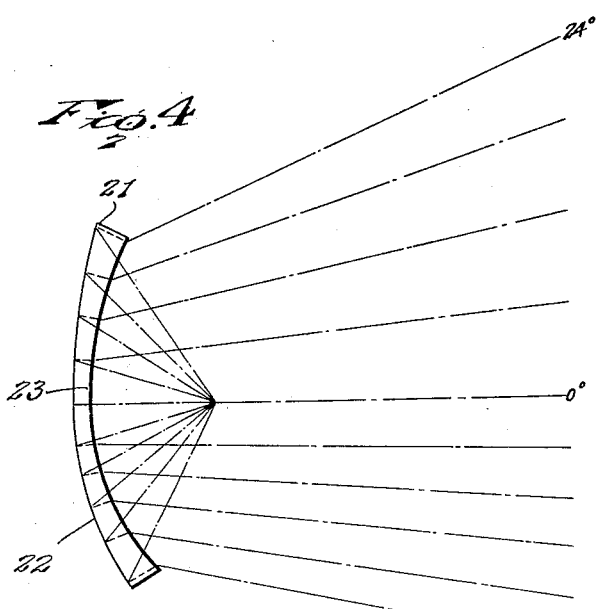
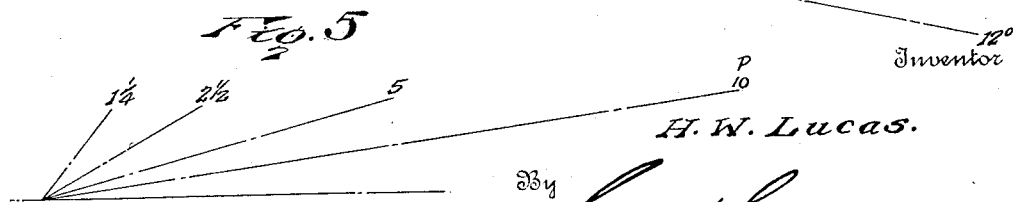
Inventor
H. W. Lucas.
By Lacey & Lacey,
Attorneys Patented Sept. 6, 1932

1,875,384

UNITED STATES PATENT OFFICE

HERMAN W. LUCAS, OF WASHINGTON, DISTRICT OF COLUMBIA

REFLECTOR

Application filed June 10, 1930. Serial No. 460,197.

This invention relates to mirror lens reflectors for aviation beacons, marine beacons, searchlights, and other purposes.

An object is to provide a reflector which will produce a beam of light which is required to have a spread in one direction greater than the spread in a direction at a right angle therefrom and to accomplish the required spread in a direction at a right angle thereto without weakening the intensity of the beam by a spread greater than is necessary; and to accomplish this result without the use of a lens separate from, and in addition to, the reflector.

A further object is to provide a reflector which will produce the highest beam intensity possible for a reflector of a given diameter and for a given source of light while fulfilling said spread requirements.

A still further object is to provide an astigmatic reflector which may be manufactured of glass and be precision ground and polished by the commercial methods now employed in the manufacture of lenses.

To accomplish the above objects my present invention incorporates astigmatism in a mirror lens reflector, the dioptric amount of astigmatism to be incorporated in each reflector depending upon the amount of astigmatic spread desired for a specific use.

It will be understood that various modifications may be resorted to within the scope of the appended claims without departing from the spirit or sacrificing any of the advantages of the invention.

In the accompanying drawing forming part of this specification:

Fig. 1 is a front view of a reflector constructed in accordance with my invention, Fig. 2 is an edge view of the reflector shown in Fig. 1, Fig. 3 is a vertical sectional view on the line 3—3 of Fig. 1, Fig. 4 is a diagrammatic view showing the vertical spread imparted to the beam by the mirror lens reflector, and Fig. 5 is a diagrammatic view illustrating the vertical spread of the cast from the modified form of the invention whereby both long distance and short distance observation is promoted.

In carrying out the invention, I provide a glass lens 21 having a toric front surface and a toric silvered rear surface. The purpose of this construction is to introduce astigmatism, that is linear distortion, in a beam projected by the reflector. Preferably the astigmatic axis is disposed vertically.

My improved reflector may be characterized by the fact that a cross section therethrough in any plane perpendicular to the polar axis will be substantially elliptical in contour, as indicated by broken lines in Fig. 1.

The ordinary air way beacon lens, such as for instance the Mangin mirror lens reflector, used in conjunction with a source of light located just back of the focal point will project a beam of substantially circular form with uniform spread in all directions. On the contrary, a beam projected by my lens reflector, with the source of light adjusted for the same beam intensity, will be of elliptical form with a spread along the major diameter greater than the Mangin and a spread along the minor diameter correspondingly less than the Mangin.

Furthermore, the Mangin, or true spherical surface mirror lens reflector, is manufactured by grinding both the front and the back surfaces on a revolving spherical tool. The mirror lens reflector embodying my invention may be manufactured by re-grinding on a stationary tool having a surface of compound curvature. Such tools are in ordinary use for the manufacture of small toric surfaces and may be modified simply in size to produce a lens embodying my improvements of suitable diameter to conform to the work required of the reflector.

It will be particularly pointed out that my improved mirror lens reflector may be accordingly precision ground and polished in accordance with the usual commercial practices.

It will be understood that the benefits of my improved lens reflector may accrue by merely incorporating astigmatism in one surface thereof, either front or back, although for maximum results it is preferable to incorporate astigmatism in both front and rear surfaces.

Figs. 1 to 4 illustrate the preferred form of the invention.

In these figures a composite astigmatic mirror lens reflector 21 is illustrated, preferably built up of two or more sections, as for example, a lower half section 22 and an upper half section 23. The lower half section has a predetermined astigmatic spread, such as for instance 24 degrees, and the upper half section has greater astigmatic spread, such as for instance 48 degrees.

Obviously, in manufacturing the invention, the lower half of a toric mirror lens reflector may be used, while the upper half of a toric mirror lens reflector having greater astigmatism incorporated therein may be employed. Thus to simplify the manufacture thereof and permit precision grinding and polishing, two reflectors, such as just described, may be each cut through a plane coinciding with the polar axis and half of one of such reflectors joined to half of the other by Canada balsam, or the half sections may be rigidly secured together in any preferred manner.

Thus the composite reflector made up of a lower half section of a reflector of 24 degrees spread will exhibit 12 degrees spread in the lower half section. The upper half section being made up of half of a reflector of 48 degrees spread will exhibit 24 degrees spread in the upper half section. The resultant composite reflector will exhibit 12 degrees spread in the lower half plus 24 degrees spread in the upper half, or a total vertical astigmatic spread of 36 degrees.

The composite astigmatic reflector thus formed will have been precision ground, as previously described, before the sections are joined. The reflector will produce a beam of maximum intensity having limited astigmatic vertical spread for a pilot approaching at 10,000 feet altitude from a distance of for instance 10 miles, as shown at P in Fig. 5, the pilot at such distance being in the lower half of the projected beam. The upper half section of the reflector provides a greater angular or astigmatic spread so that the pilot approaching at, for instance an elevation of 10,000 feet, will remain in the beam much longer due to the greater spread of the upper half. This is clearly shown in Fig. 5, wherein the numerals 5, 2½ and 1¼ designate horizontal distances in miles from the beacon.

It is conceivable that a mirror lens reflector such as above described may be manufactured at greatly decreased cost if cast, molded, or otherwise fabricated in one solid piece. Such a reflector, of course, cannot be precision ground by ordinary tools and, therefore, will not exhibit the high degree of efficiency to be found with a precision ground reflector. Therefore, the scope of the invention extends to a toric one-piece mirror lens reflector having a greater degree of astigmatism built into the upper half than built into the lower half.

Having thus described the invention, I claim:

1. In a search light beacon for airways, a bifocal mirror lens reflector comprising a glass lens having front and rear toric surfaces, the rear surface being silvered, the focal length of the top half of the lens being greater than the focal length of the bottom half of the lens whereby the lens exhibits predetermined astigmatic spread of uniform intensity from the axis of light projection upward and a less astigmatic spread of uniform intensity from the axis of light projection downward.

2. In a search light beacon for airways, a bifocal mirror lens reflector comprising a glass lens having front and rear toric surfaces, the rear surface being silvered, the lens being formed of an upper half section and a lower half section bonded together, the lower half section being formed of one-half of a mirror lens reflector of predetermined focal length and astigmatic spread and the upper half section being formed of one-half of a mirror lens reflector of greater focal length and astigmatic spread whereby the lens exhibits a predetermined astigmatic spread of uniform intensity from the axis of light projection upward and a less astigmatic spread of uniform intensity from the axis of light projection downward.

In testimony whereof I affix my signature.

HERMAN W. LUCAS.